United States Patent

[11] 3,609,020

[72] Inventor Joseph Kelly
Huntington, N.Y.
[21] Appl. No. 809,620
[22] Filed Mar. 24, 1969
[45] Patented Sept. 28, 1971
[73] Assignee Minitek, Inc.
New Castle, Del.

[54] FILM PROJECTOR AND AUTOMATED THEATER PROJECTION SYSTEM
24 Claims, 14 Drawing Figs.

[52] U.S. Cl. .................................................. 352/40, 352/92, 352/130
[51] Int. Cl. ..................................................... G03b 21/50
[50] Field of Search ......................................... 352/92, 38, 236, 40

[56] References Cited
UNITED STATES PATENTS
2,473,468  6/1949  Cooley .......................... 352/92
3,309,163  3/1967  White ........................... 352/92

FOREIGN PATENTS
711,481    7/1954  Great Britain ................ 352/92
1,113,872  9/1961  Germany ....................... 352/92

Primary Examiner—S. Clement Swisher
Attorney—Roberts & Cohen

ABSTRACT: A film projector is provided with a cue detector for generating a signal to start a theater-control procedure or sequence when a transparent or translucent tape is detected on a film which is to be or has been projected. The projector also has a cleaning attachment through which the film passes prior to entering the interior of the projector. A programmer and associated circuitry are provided for automatically turning off pre- or inter-show music, dimming house lights, turning on the projector as well as picture sound mechanisms, and opening the curtain at the beginning of a show in the theater. The programmer is moreover adapted for closing the curtain, turning up the house lights, turning off the projector and sound mechanisms, turning on the aforesaid music, and turning off the projector at the end of a show. The programmer, in one form, includes a bank of cams relative to which special provision is made to avoid self-terminating characteristics.

PATENTED SEP 28 1971

INVENTOR.
JOSEPH KELLY

BY
Roberts & Cohen
ATTORNEYS

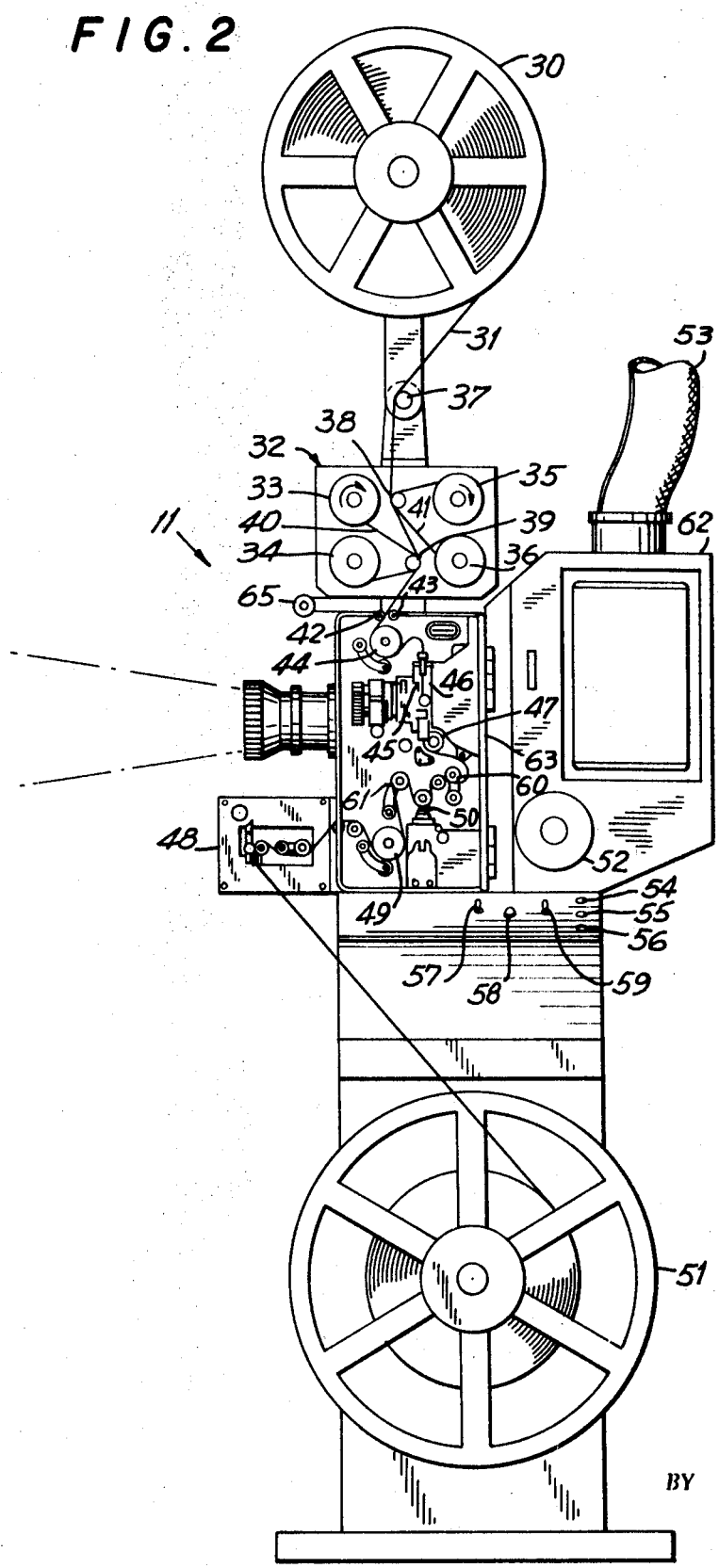
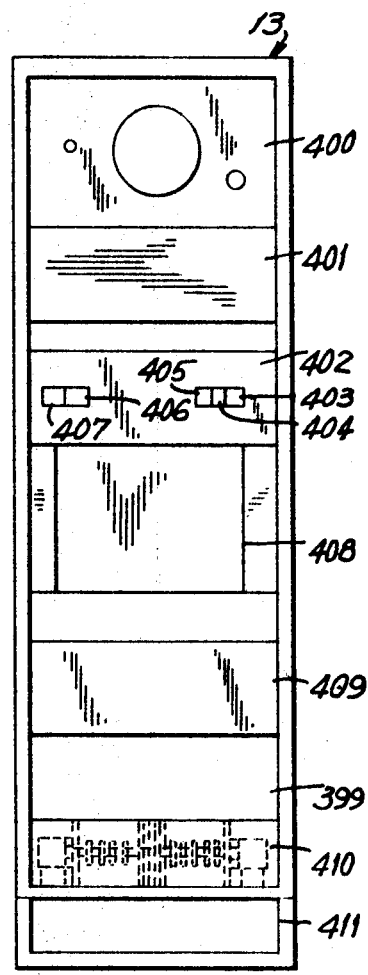

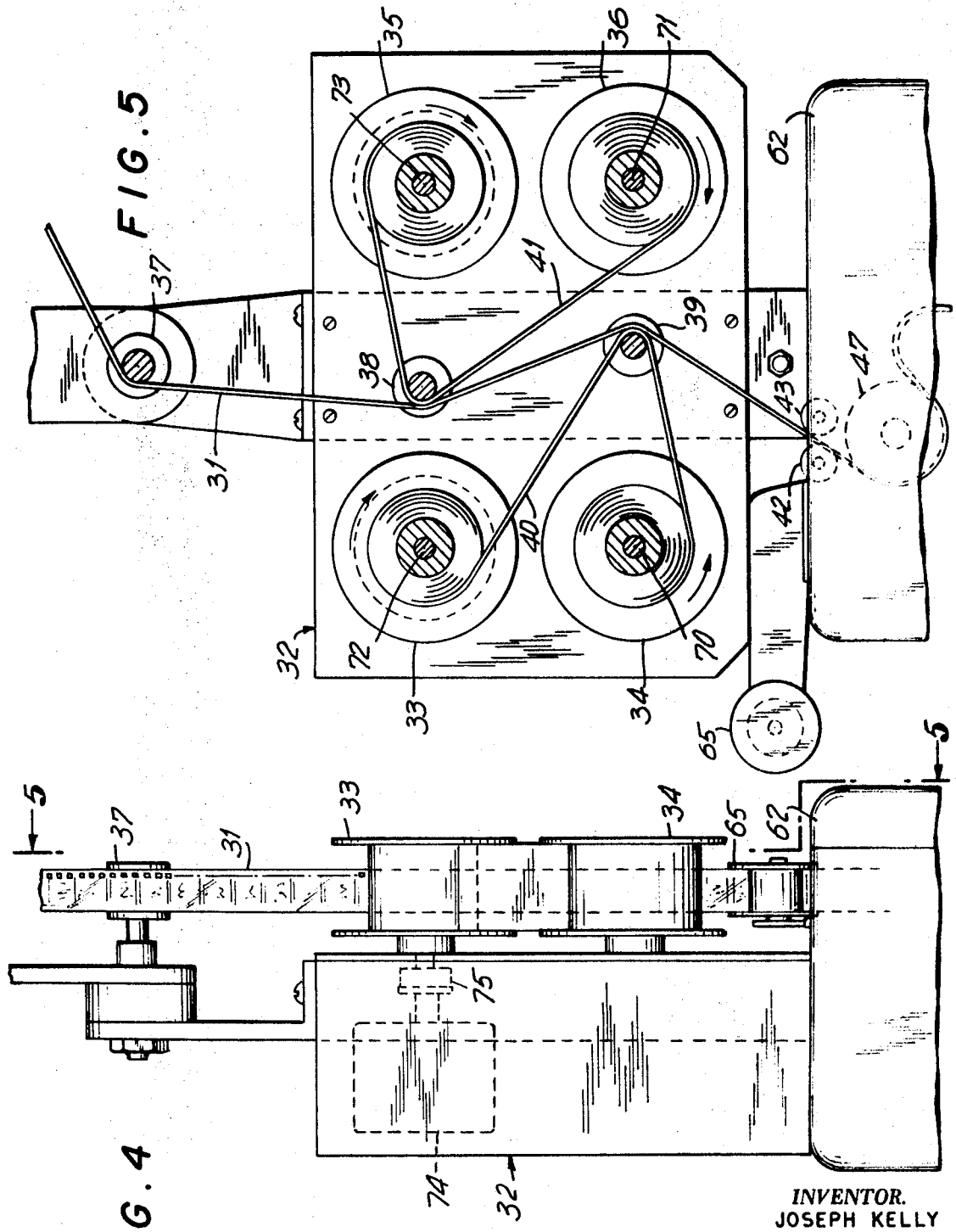

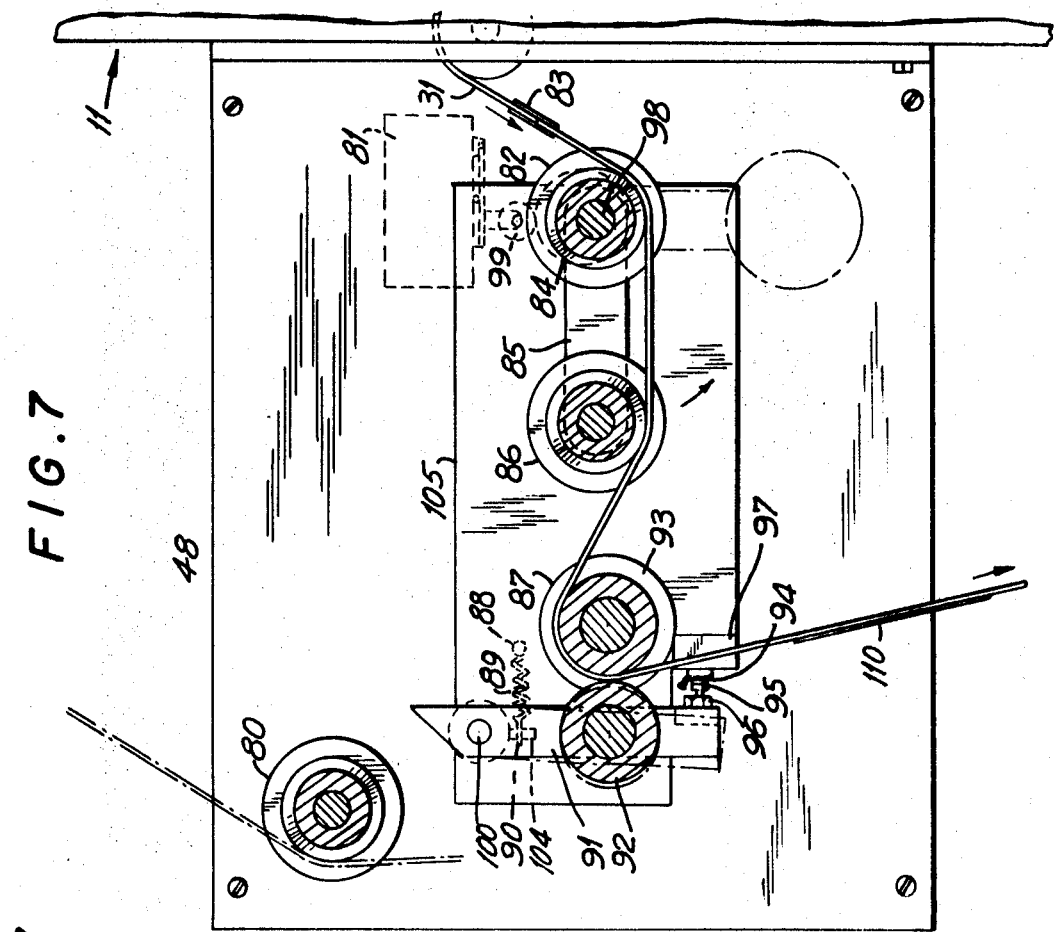
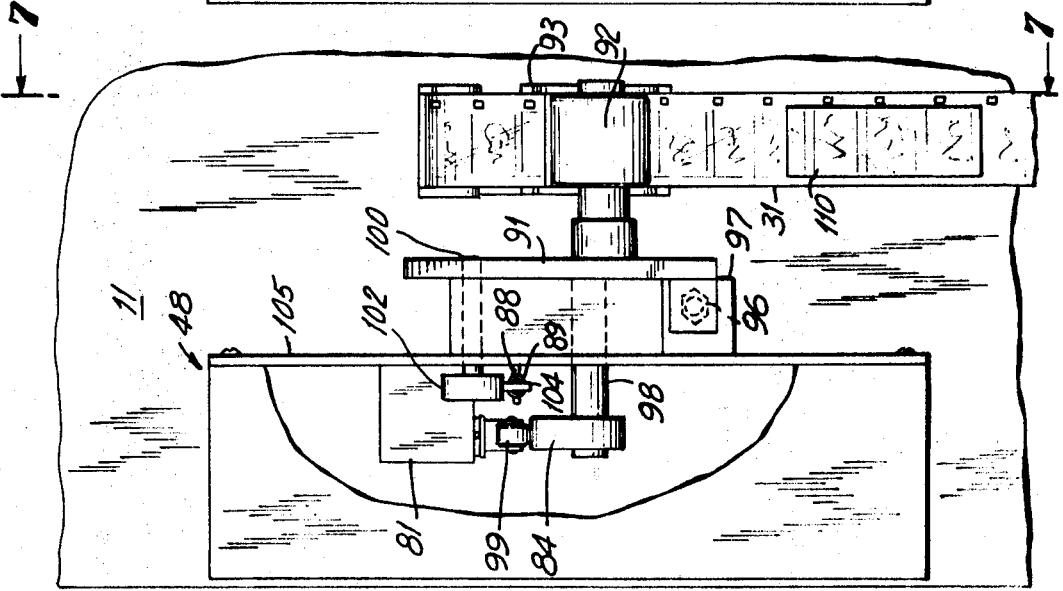

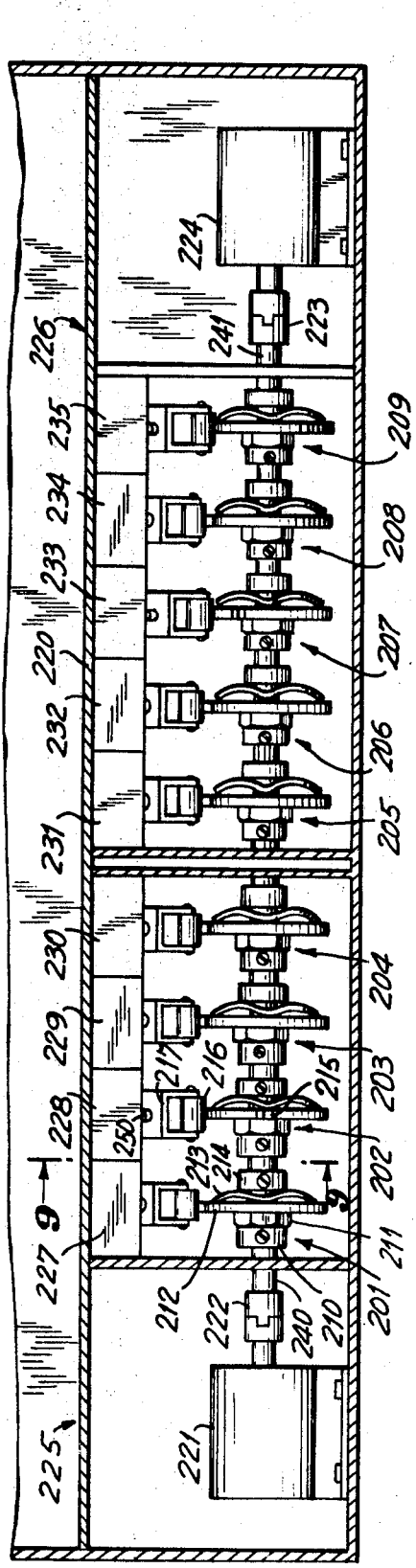
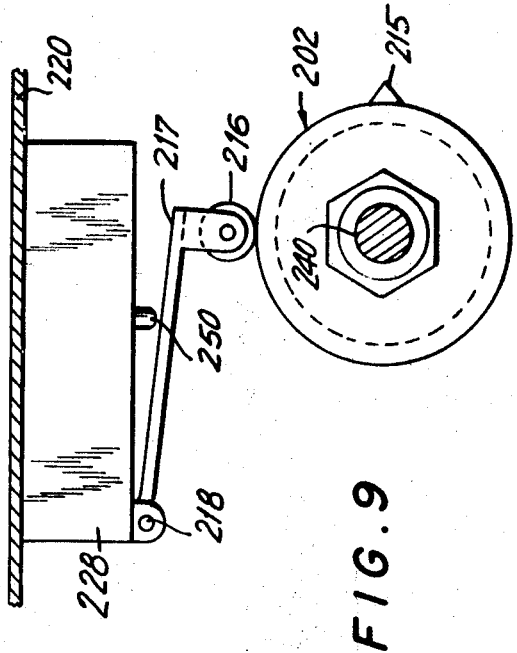
FIG.8
FIG.9

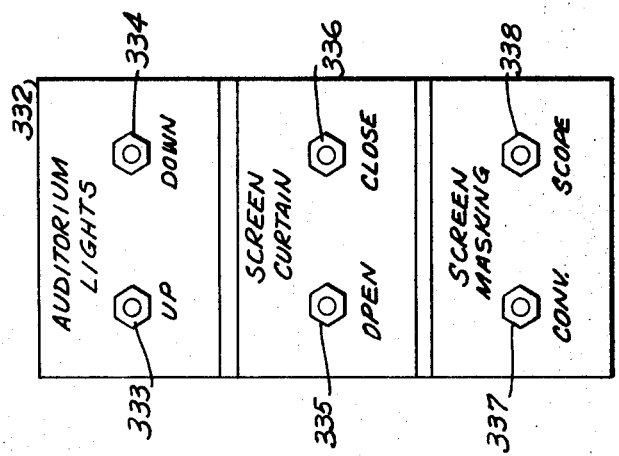
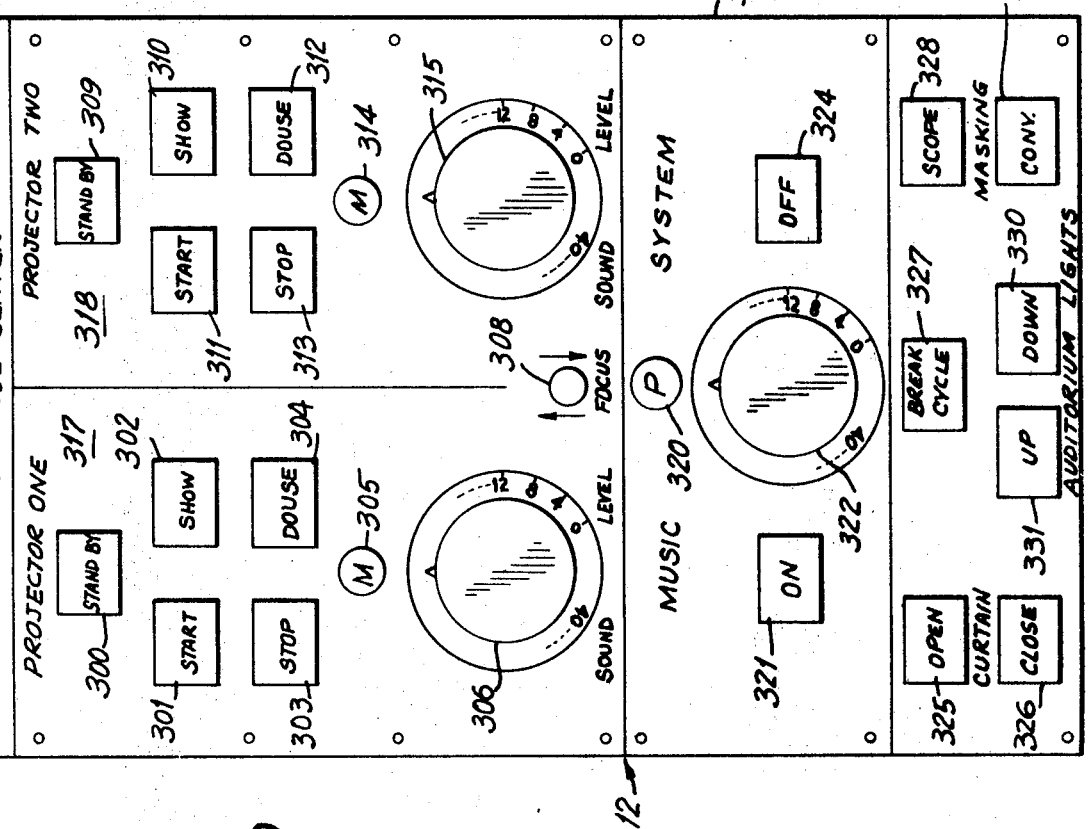

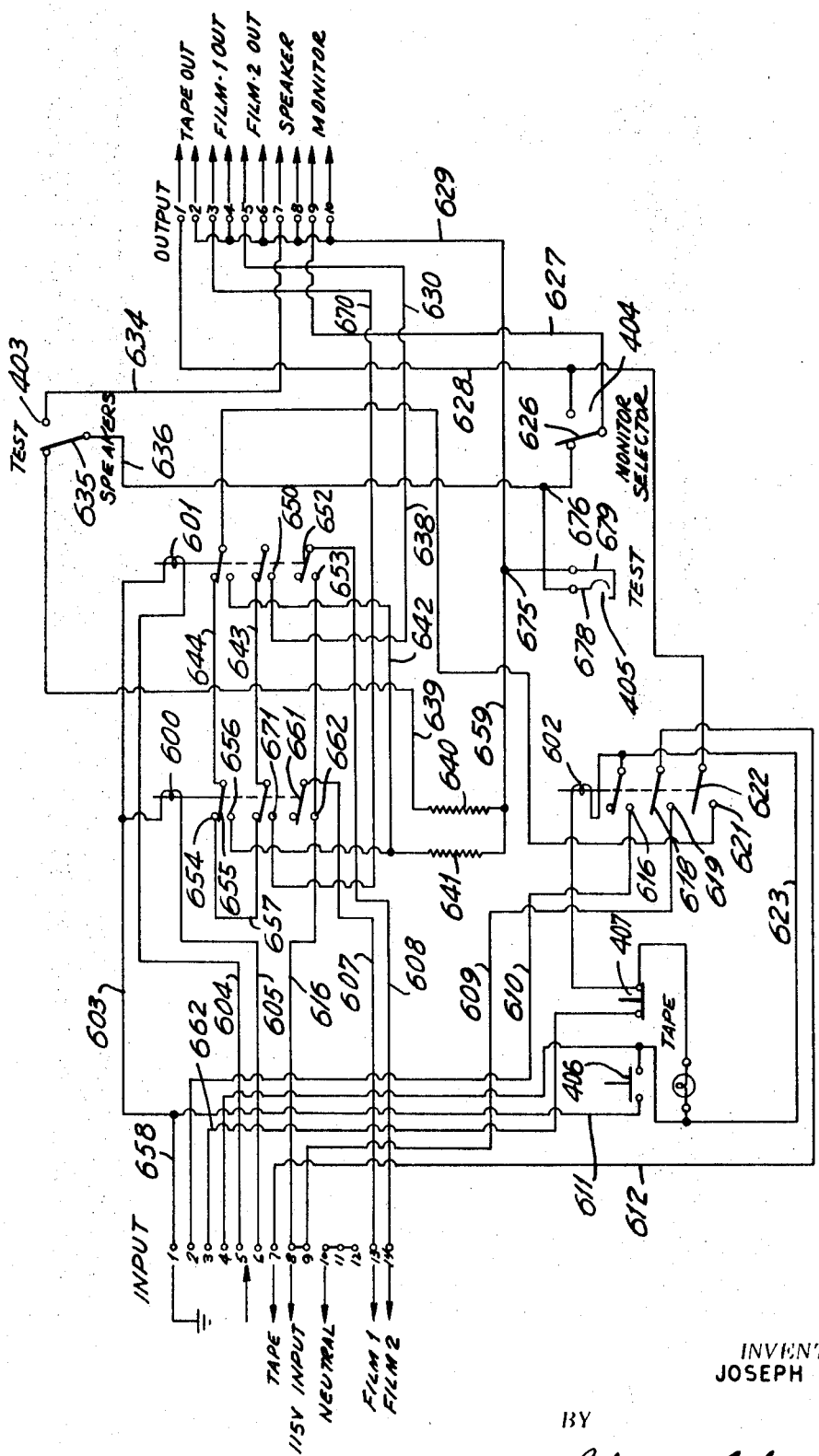

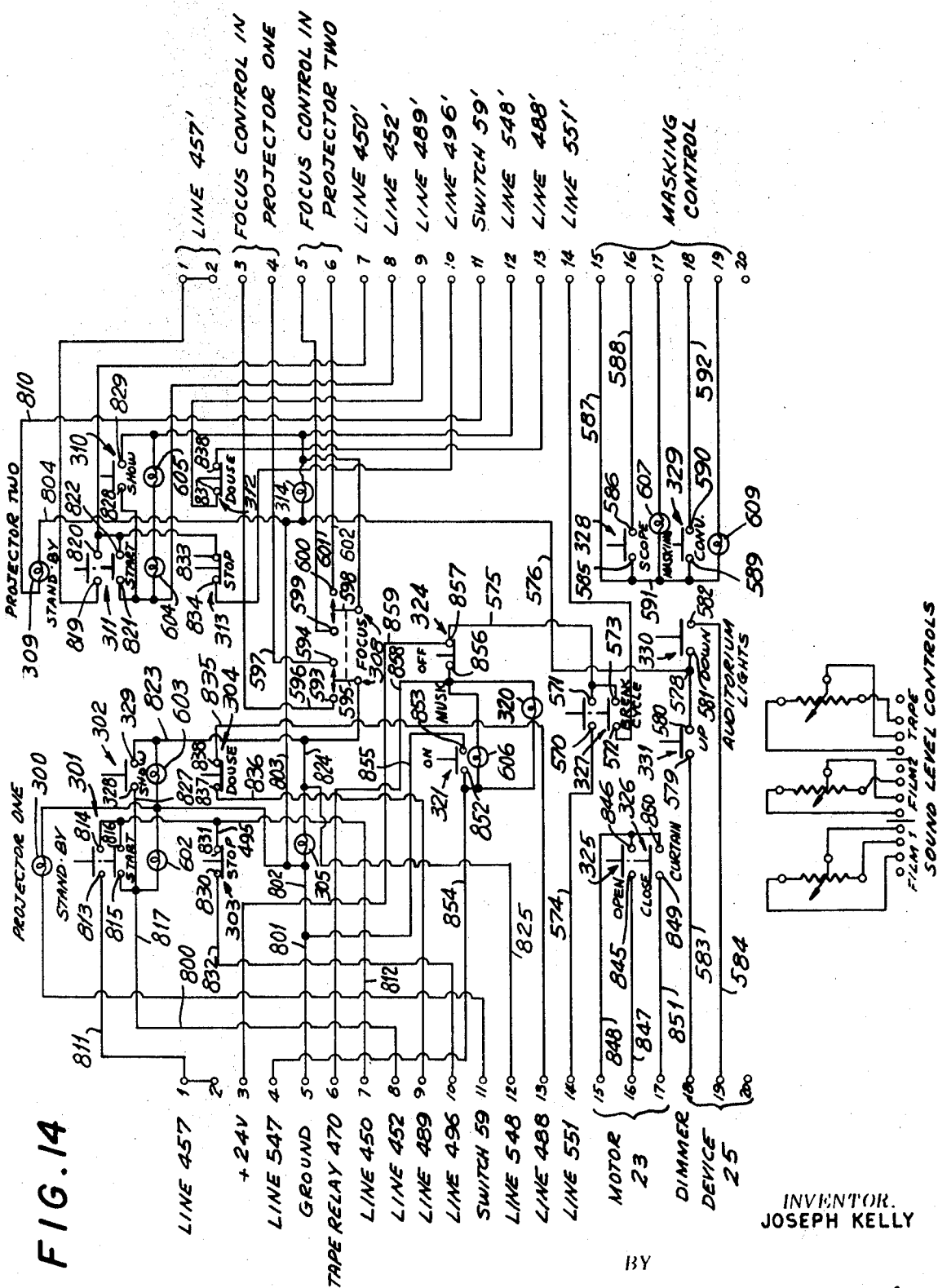

FILM PROJECTOR AND AUTOMATED THEATER PROJECTION SYSTEM

BACKGROUND OF THE INVENTION

1. Field of the Invention

The present invention relates to improved film projectors and automated theater projection systems and to associated controls.

2. Description of the Prior Art

The placing of a cue on a film is known for purposes of initiating an event or sequence of events when a predetermined point is reached during the course of travel of the film. For example, cue marks have been used to produce electrical impulses for operating signalling devices, sound effect devices, volume controls, projector starting, stopping and changeover devices, rewind controls and the like. Illustrative patents relating to the aforegoing include U.S. Pat. Nos. 1,696,968; 1,972,904; 1,749,187; 3,374,723; and various others.

Moreover, many types of cue marks have been used. For example, notches have been cut into the edge of a film and feelers sensitive to such notches have been employed to detect the same. Cue marks of this type have been found wanting in that they tend to weaken the film.

Magnetic clips, paint and electrical conducting clips have also been used. These cues are also subject to various disadvantages. For example, it is difficult to apply them to the film, and they tend to interfere with handling of the film.

SUMMARY OF THE INVENTION

In accordance with one feature of the present invention, there is provided transparent or translucent cuing means of a predetermined length on the face of a film for initiating an event or a sequence of events when the cuing means is sensed by means for generating an electrical impulse. The transparent or translucent cuing means of the present invention avoids the problem of weakened film which, as previously discussed, occurs in the prior art. Such cuing means also avoids electrical interference such as may occur with magnetic cues, and also avoids problems as might otherwise occur in passing the film through a projector.

In accordance with another feature of the present invention, means responsive to the transparent or translucent cuing means causes a charged capacitor in an RC network to discharge, for a predetermined period of time correlated to the length of the cuing means, to generate a pulse of a predetermined amplitude. Means responsive to such pulse are provided for initiating a sequence of theater-control events.

In accordance with still another aspect of the present invention, there are provided means for cleaning the film to avoid magnification of dirt, dust and other particle images during projection.

BRIEF DESCRIPTION OF THE DRAWINGS

FIG. 2 is a side view of a projector with a cleaning attachment and cue detector of the invention associated therewith;

FIG. 3 is a front view of a components cabinet for storing elements of the system disclosed herein;

FIG. 4 is a side view of the cleaning attachment;

FIG. 5 is a sectional view of the cleaning attachment of FIG. 4 taken along line V—V;

FIG. 6 is a side view of a drive interlock and pulse detector suitable for practicing an aspect of the present invention;

FIG. 7 is a sectional view of the drive interlock and pulse detector of FIG. 6 taken along line VII—VII;

FIG. 8 shows a side view of a programmer arrangement for practicing an aspect of the present invention;

FIG. 9 is a sectional view of FIG. 8 taken along line VIII—VIII;

FIG. 10 is a front view of a control panel employed in accordance with the invention;

FIG. 11 is a front view of a further control panel;

FIG. 13 is a schematic representation of an audio panel circuitry employed in accordance with the invention; and FIG. 14 is a schematic representation of a further control panel.

DETAILED DESCRIPTION

Figure 1:
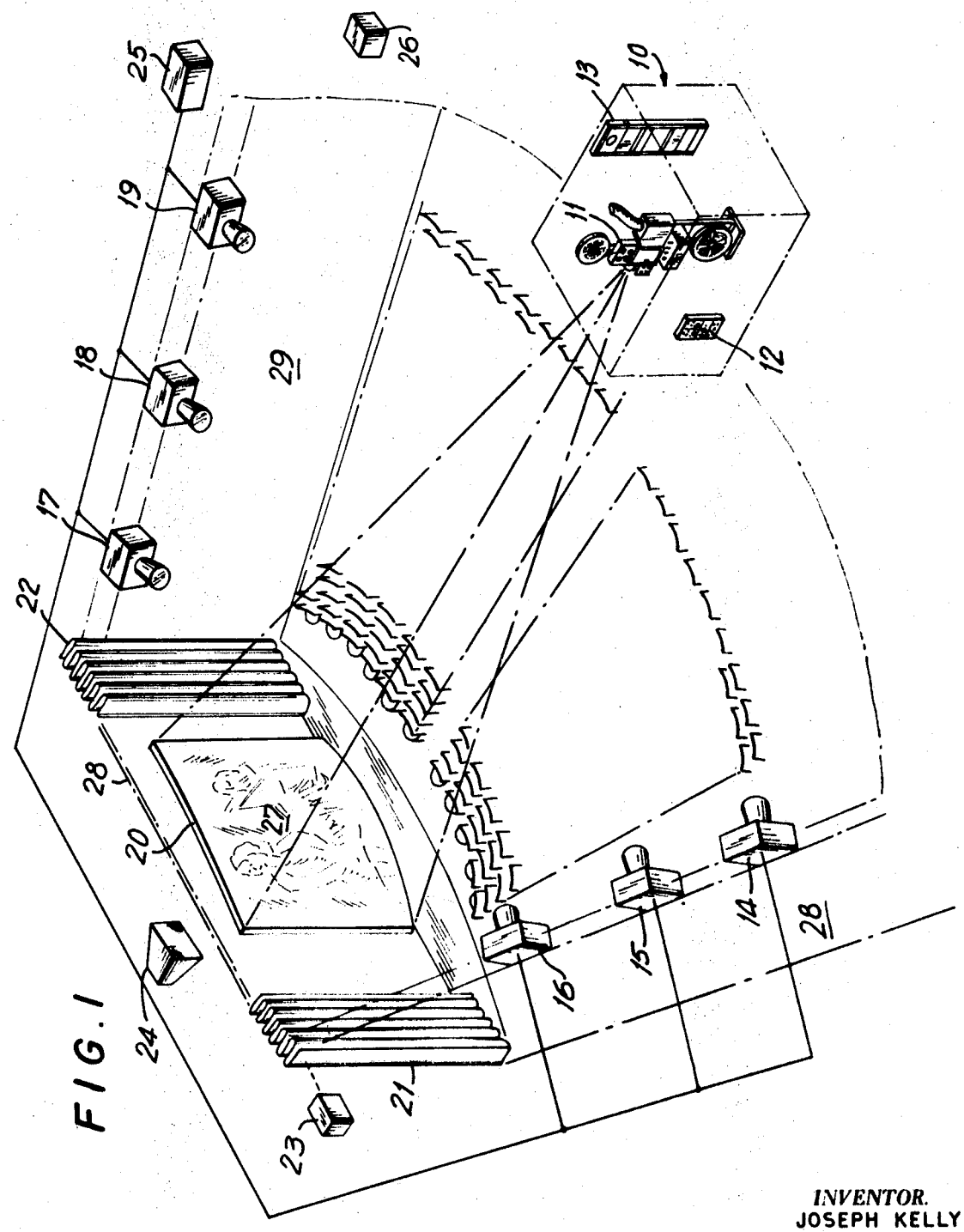
FIG. 1 is a diagrammatic representation of a theater including various components of the present invention.

FIG. 1 is a diagrammatic representation of a theater embodying various aspects of the present invention. A projection booth 10 is located in the rear of the theater in a position for displaying on a curtain 20 an image 27 beamed from a projector 11 within the booth 10. The booth 10 can be relatively small because the automated system of the present invention eliminates the need for a projectionist to be stationed continuously within the booth during the showing of a film.

A control panel 12 for the automated system of the present invention is located outside of the booth 10 or in any other part of the theater as desired, preferably at the rear thereof. The control panel 12 comprises, as will be shown, a plurality of switches for initiating operation of the automatic system and for overriding the automatic system. The panel also includes a plurality of lights for indicating the various parts of the sequences as they occur in time.

A components cabinet 13 is shown within the booth 10. The components cabinet 13 contains various circuit banks and programmer components used in carrying out various operations in accordance with the present invention.

A plurality of lights 14–19 are arranged along the upper portions of sidewalls 28 and 29 of the theater. The lights 14–19 operate under the control of a motorized dimmer device 25 such that there is provided a gradual transition of light intensity between on and off. The motorized dimmer device 25 is actuated and controlled by the automated system of the present invention. The lights 14–19 may also be positioned along the ceiling (not shown) of the theater or in any other desired location within the theater. A light override switch panel 26 may be located in any desired part of the theater, preferably at the rear thereof, to provide for manual operation of the lights in the unlikely event of a malfunction in the automated system or to account for some other type of emergency.

The screen 20 is a standard screen behind which is located a speaker 24. The speaker 24 is preferably centrally positioned behind the screen and at two-thirds the height of the screen 20. The automated system of the present invention automatically and selectively applies pre- and intershow music or film sound to the speaker 24.

A curtain comprising curtain elements 21 and 22 is operated by a cable 28 in response to the operation of a drive motor 23 to conceal or reveal the screen 20 to the audience. The driver motor 23 may be a commercially available motor having limit switches for turning off the motor when the curtain elements 21 and 22 are at either full close or full open.

As will be described in detail hereinafter, the automated system of the present invention causes the following illustrative sequences of events to occur at the start of the show and at the close of the show:

| SHOW START | SHOW CLOSE |
| --- | --- |
| 1. Canned music off, dimmer down | 1. Curtain close |
| 2. Picture and picture sound on | 2. Dimmer up |
| 3. Curtain open | 3. Picture and sound canned off, canned music on |
|  | 4. Projector off |

The projector 11 employed in accordance with the invention is shown in greater detail in FIG. 2. With reference to FIG. 2, a film 31 is threaded from a supply reel 30 over a roller 37 through a cleaning attachment 32, which will be described in more detail hereinafter, through a pair of rollers 42 and 43, around a drive sprocket 44 and between an adjustable pressure plate 45 and an aperture plate 46, through a stop-go Geneva movement drive sprocket 47, through a pressure roller 60, and to a sound optical system 50. From the sound optical system 50, the film 31 is passed around pressure roller 61, through a drive sprocket 49, through a drive interlock and pulse detector 48 (which will later be discussed) and to a takeup reel 51.

A door 63 for access to the interior of the projector 11 is shown in opened position. The projector also includes a projector lamp housing 62 with a blower 52 externally mounted at the lower end thereof and a vent hose 53 connected to the upper end thereof. The blower 52 drives air into the lamp housing 62 to prevent the accumulation of ozone and in order to evacuate heat from the lamp housing 62 via the ventilation hose 53. The ventilation hose 53 is preferably connected to a duct which is located over the booth 10 and connected to an exhaust blower (not shown). A roller 65 extends in forward direction from the projector 11 and is used for rewinding the film 31 back onto the supply reel 30 from the takeup reel 51.

The cleaning attachment 32 mentioned above is shown in greater detail in FIGS. 4 and 5 wherein appear two spools 34 and 36 of cleaning tape mounted on idler pins 70 and 71, respectively. The cleaning tapes may be silicon treated feltlike types which are commercially available for cleaning film under laboratory conditions.

The cleaning tape 40 of one of the spools 34 is threaded about a roller 39 and onto a takeup spool 33 which is mounted on a drive shaft 72. Similarly, the cleaning tape 41 of the other spool 36 is threaded about roller 38 and onto a second takeup spool 35 mounted on a second drive shaft 73.

Each of the takeup spools 33 and 35 is driven by an associated motor 74, diagrammatically shown in FIG. 4. The motors 74 drive takeup spools 33 and 35 at a relatively slow speed, preferably four revolutions per hour, through a coil spring and dog clutch 75. The motors 74 drive their respective takeup reels 33 and 35 clockwise as shown by the arrows in FIG. 5.

The film 31 is brought into contact with the cleaning tapes 41 and 40 at rollers 38 and 39. The cleaning tapes 40 and 41 are, as can be seen, driven in a direction of travel opposite that of the film 31 which minimizes the possibility of dirt falling into the projector. Separate motor drives for the takeup spools 33 and 35 are provided to permit independent operation of the cleaning tapes 40 and 41, and to lessen the possibility of one or both of the tapes binding which might result in scratching the film.

The cleaning tapes should be of a length to last for two or more showings of a film. The tapes must be replaced when there is insufficient tape remaining on spools 34 and 36 to last for an entire showing of a film. Each of the takeup spools 33 and 35 may be provided with limit switches (not shown) for indicating when a predetermined amount of tape has been utilized.

The invention contemplates the preferred use of smaller films such as 16 mm. film whereby smaller reels can be used and supervision minimized. A problem raised by the use of 16 mm. film is that dirt, dust and other particles may be magnified to such an extent during projection that they may interfere with the clarity of the displayed picture. The aforesaid cleaning device takes care of this problem and thus contributes materially to the automation of the system.

FIG. 3 shows the components cabinet 13 which, as noted above, is located within the projection booth 10. A monitor 400 is positioned at the top of the cabinet 13 to enable monitoring the film sound track and taped music outputs. A film audio component rack 401 is mounted below the monitor 400 and an audio panel 402 is mounted below the rack 401. Rack 401 includes tape ON and tape OFF switches 406 and 407, an OFF/TEST-ON speaker switch 403, a monitor selector switch 404 movable between a line to the speaker 24 and the tape output, and a test switch 405 for testing the monitor 400. A tape cartridge 408 is mounted below the audio panel 402, and a tape cartridge amplifier 409 is positioned below the tape cartridge 408. A programmer 410 is mounted below the tape cartridge amplifier 409, and a 24 volt DC power supply 411 is located at the bottom of the components cabinet 13. An empty space 399 is provided to store a second programmer when a two-projection system is used. The circuit and component interconnections of the various panels in the components cabinet 13 will be described hereinafter.

The drive interlock and pulse detector 48 of FIG. 2 is shown in greater detail in FIGS. 6 and 7 wherein it is seen that the film 31 passes along the bottom of a roller assembly which comprises a roller 82 and a roller 86 interconnected by an extension arm 85. The extension arm 85 is fixedly secured to a pivot bar 98. A cam 84 is also fixedly secured to the pivot bar 98 at the left end thereof as viewed in FIG. 6.

The roller assembly rides on the film and its horizontal position as viewed in FIG. 7 is a function of the tension maintained on the film 31 by the takeup reel 51. Any loss of normal film tension will cause the roller assembly to pivot counterclockwise about the pivot bar 98 in the direction indicated by the arrow in FIG. 7. Undue rotation of the roller assembly causes the cam 84 to actuate a microswitch 81 by depressing a switch actuator arm 99. The microswitch 81 is connected to the automated system of the present invention such that actuation thereof automatically removes power from the projector 11 to stop its operation.

An example of loss of normal film tension is film breakage. When this occurs, the roller assembly rotates about the axis of the pivot bar 98 to a vertical position as shown by the phantom lines in FIG. 7.

From the roller 86, the film is threaded between a pair of film driven idler rollers 92 and 93. Roller 92 is rotatively secured to an extension arm 91 which in turn is fixedly secured at its upper end to an elongated member or pin 100. A disc 102 is also fixedly secured to the left end of the elongated element 100 as viewed in FIG. 6. A spring 89 is attached by means of a pin 90 to an arm 104 extending from the bottom of the disc 102. The spring 89 extends perpendicularly from the disc arm 104 and is attached to a mounting plate 105 by a securing pin 88. The securing pin 88 may be adjustable to vary the tension exerted on the disc arm 104 by the spring 89.

Clockwise movement, as viewed in FIG. 7, of the extension arm 91 about the axis of the elongated member 100 acts to open a pair of normally closed contacts 94 and 95. Contact 94 is secured to an electrically insulated block extending from the mounting plate 105. Contact 95 is threadedly affixed to the lower end of the extension arm 91 by means of an adjustment nut 96. The adjustment nut 96 is provided to enable setting up the condition in which the contacts are in a normally closed position.

In accordance with an important feature of the invention, a contact actuating strip or cue 110 is secured to one of the surfaces of the film 31 to open the normally closed contacts 94 and 95 upon passing between the rollers 92 and 93. More particularly, the strip 110 acts to force the extension arm 91 to pivot about the axis of the elongated member 100 to the position shown by phantom lines which results in opening the contacts 94 and 95. The opening of the normally closed contacts 94 and 95 by the strip 110 is thus the result of a cue for controlling the initiation of an event or sequence of events in the automated system of the present invention. For example, the strip 110 may be positioned near the end of the film 31 to initiate the SHOW CLOSE sequence of events discussed hereinabove.

Since the film 31 may contain ordinary splices 83 which might be confused with cue 110, the strip 110 has a predetermined length such that the contacts 94 and 95 are maintained in an opened position for a predetermined period of time. As will be described more fully hereinafter, a circuit is provided which is responsive to an opening of the contacts 94 and 95 only when they are opened for a predetermined period of time. For example, the strip 110 should be at least 3±1/2 inches for a 16 mm. film to provide a greater than 250 millisecond to 420 millisecond contact-open period which, as will be shown, is necessary to initiate the SHOW CLOSE sequence in the circuit to be described hereinafter.

The contact actuating strip 110, moreover, in accordance with the invention, should be translucent or transparent to avoid interfering with the image being displayed on the curtain 20. Further, the strip 110 should have a smooth surface to prevent scratching the portion of film coming into contact with it due to winding on the reel. In addition, the strip 110 is preferably composed of nonmetallic substances to preclude interference with the sound track, and should be heat resistant to avoid damage to the film. Still further, the strip 110 should be sufficiently small to avoid interference with the sprockets, for example, a three-eighths to one-half inch width is preferable for a 16 mm. film. The strip 110 is preferably at least 0.002 inches in thickness to insure that the contacts 94 and 95 provide a distinct signal to the circuit described hereinafter. One commercially available material suitable for use as the strip 110 to achieve all of the above objectives is Mylar tape provided on one side with a pressure responsive adhesive for adhering to a film.

The illustrated embodiment of the invention utilizes a pair of cam actuated programmers 225, 226 as shown in FIG. 8. Each of the programmers 225 and 226 is mounted within housing 220 and respectively comprises a reduction gear motor 221 or 224, which are preferably a shaded-pole induction motor operable on 115 volts AC, 60 cycle power.

The motors 221 and 224 respectively drive a shaft 240 or 241 through a spring loaded clutch 222 or 223 at a relatively low speed, preferably 2 r.p.m. The shafts 240 and 241 respectively have a plurality of cam assemblies 201–204 or 205–209 fixedly secured thereto. Each of the cam assemblies 201–204 and 205–209 comprises a setscrew collar 210, an adjusting nut 211, a fiber cam 212, a spring washer 213 and a spring setscrew collar 214. The setscrew collar 210, the adjusting nut 211, and the cam 212 are preferably integrally formed. The cams of each cam assembly 201–204 and 205–209 are each radially positioned on a shaft 240 or 241 such that it actuates one of the microswitches 227–235 at a predetermined point in time during rotation of its shaft 240 or 241.

In FIG. 9 is shown an illustrative side view of cam assembly 202 with its associated microswitch 228. When the cam protrusion 215 contacts a roller 216, it acts to force an actuating arm 217 upwardly about a pivot pin 218 to depress a switch plunger 250 and thereby actuate the timer 228. Each of the cam assemblies 201–209 is rotationally positioned on its respective shaft 240 or 241 by loosening the associated setscrew collars 210 and 214 and rotating the cam 212 to its required position. Thereafter, the collars 210 and 214 are tightened such that the spring washer 213 is tensioned and the cam assembly is rigidly secured to its shaft 240 or 241.

Each of the microswitches 227–235 act upon circuitry to be hereinafter described to cause a desired sequence to be initiated during a predetermined period of time in the program. A typical program which may be carried out by programmer 225 is that (a) cam assembly 201 causes the "canned" pre- or inter-show music to be turned off and the house lights 14–19 (FIG. 1) to be dimmed down at +5 seconds in the program, (b) cam assembly 202 acts to turn the picture and sound on at +17 seconds in the program, (c) cam assembly 203 initiates the curtain drive motor to open the curtains 21 and 22 at +20 seconds in the program, and (d) cam assembly 204 acts to recycle programmer 225 at +30 seconds in the program.

At the end of a show, programmer 226 may typically cause the following events to occur: (a) cam assembly 209 causes the curtains 221 and 222 to close at +5 seconds after the beginning of the SHOW CLOSE program, (b) cam assembly 208 causes the house lights 14–19 to be turned up at +10 seconds in the program, (c) cam assembly 207 initiates picture-and-sound off and turns the canned music on at +17 seconds in the program, (d) cam assembly 206 turns the projector off at +25 seconds in the program, and (e) cam assembly 205 recycles programmer 226 at +30 seconds in the program.

The control panel 12, located outside the projection booth 10 and preferably at the rear of the theater, is shown in FIG. 10 in which appear two projection control panel sections 317 and 318. Each projector control panel section 317 or 318 includes a STANDBY light 300 or 309 which light when the toggle switches 57 and 59 (FIG. 2) on the side of the projector are in their AUTO PRESET and STANDBY lamp positions, respectively, to indicate that the system is conditioned for automatic operation. An illuminated START pushbutton 301 or 311 is provided on each projector control panel 317 and 318 for initiating the automatic projection system when the associated STANDBY light 300 or 309 is on. Each of the START buttons will light when actuated to begin the automatic sequence.

The projector control panel sections 317 and 318 also include SHOW 302 and 310, STOP 303 and 313, and DOUSE 304 and 312 which are illuminated pushbuttons for manual operation of either of the two projectors. The SHOW buttons 302 and 310 are lighted when actuated and permit overriding the program circuitry for manual controlled showing if the programmer fails. The STOP buttons 303 and 313 and DOUSE buttons 304 and 312 provide for manual stopping of the system and for moving a douser or shade (not shown) between the projector lamp nd film to shield the latter against heat.

The projector control panel sections 317 and 318 also have pilot lights 305 and 314 which are lighted by action of the programmer, and sound-level control dials 306 and 315 for controlling the volume of the film audio output to the speakers 24 (FIG. 1). A focus control dial 308 is also provided for adjusting the focus of the film displayed by either of the projectors.

A music-system control panel 319 is positioned below the projector control panel sections 317 and 318, and includes tape ON 321 and tape OFF 324 pushbuttons for manual control of taped music piped to the speakers 24 before and after displaying a film on the screen 27. The music-system control panel 319 also has a pilot light 320 which is automatically turned on by the programmer when the system is operated automatically. A sound-level control dial 322 is also provided on the face of the music-system control panel 319 for controlling the volume of the tape output. Each of the sound-level control dials 306, 315, 322 are connected to the system for controlling the volume when operating in either of the automatic or manual modes.

Manually operated curtain-open switch 325 and curtain-close switch 326 are provided on the control panel 12 for manual actuation of the curtain-drive motor 23 for opening and closing the curtains 21 and 22. Further, UP-DOWN buttons 331 and 330 are provided on the face of the control panel 12 for manual operation of the motorized dimmer 25 to control the theater lights 16–19. A masking scope pushbutton 328 and a masking conventional pushbutton 329 are provided on the control panel 12 for adjusting the masking for Cinemascope or conventional films, respectively. A break cycle pushbutton 327 is also provided on the face of the control panel 12 for overriding the programmer to turn the theater lights 16–19 on and to start the taped music.

The manner in which the elements of the control panel 12 are interconnected in the automatic and manual projection systems of the present invention will be described in detail hereinafter.

With reference to FIG. 11, there is shown a remote manual control panel 332 which is preferably located in the projection booth 10. The remote manual control panel 332 includes UP and DOWN pushbuttons 333 and 334 for manually controlling the theater lights 16–19, open and close pushbuttons 335 and 336 for manual opening and closing of the curtains 21 and 22, and conventional and screen masking pushbuttons 337 and 338 for manual adjustment of the screen masking between conventional and Cinemascope. Thus, the present invention permits automatic operation of the projection system from the control panel 12, and for manual operation of the system from the control panel 12 or from within the projection booth 10.

Figure 12:
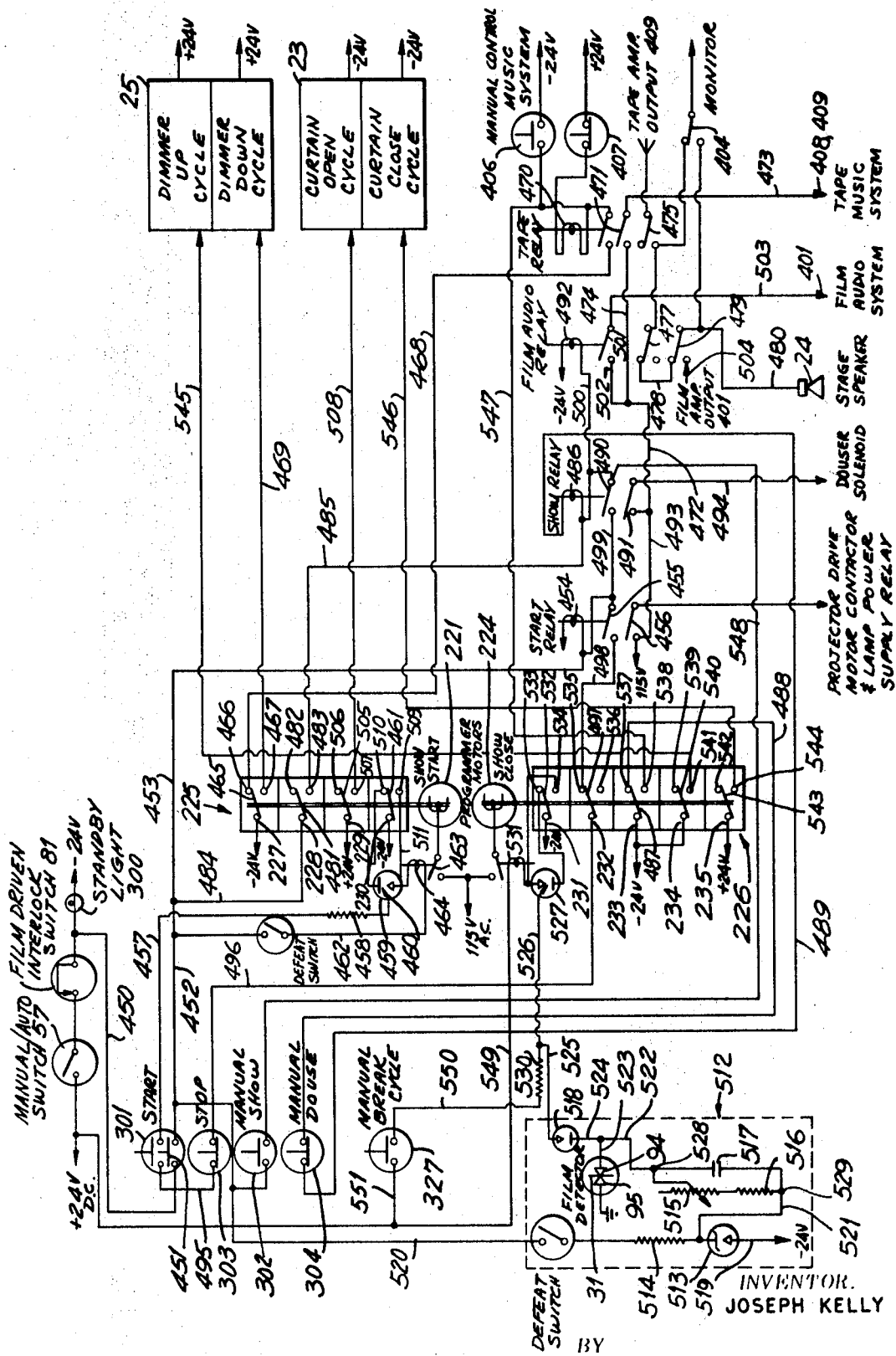
FIG. 12 is a schematic representation of an automatic and manual projection control system employed in accordance with the invention.

In FIG. 12, there is shown a simplified schematic diagram of the automated projection system of the present invention. To place the system in operation, the manual/automatic toggle switch 57 (also shown in FIG. 2 on the side of the projector 11) is moved to "automatic" by closing the switch. The standby light toggle switch 59 (FIG. 2) must also be actuated to supply power to the standby light 300. In addition, the film driven interlock switch 81 (FIG. 7) must be in its closed state as will be caused by a properly tensioned film as noted hereinabove. When these three switches are closed, the standby light 300 on the control panel 12 (FIG. 10) will light to indicate that the system is ready for automatic operation.

Actuation of the start button 301 on the control panel 12 applies 24 volt DC power via line 450, switch arm 451, and lines 452 and 453 to a start relay 454. The start relay acts to close switch arms 455 and 456. Closure of start relay arm 456 applies power to the projector drive motor and lamp to initiate projection. Actuation of the start button 301 applies a momentary voltage pulse along line 457 through resistor 458 to a gate 460 of a silicon control rectifier 459. When the rectifier 459 receives this pulse, a programmer relay 464 has one terminal of its coil connected to a −24 VDC source of power by way of the rectifier 459 and a normally closed switch arm 461 of the programmer's self-terminating switch 230. The other side of the coil of the relay 464 is connected to a +24 VDC power source via line 462 and line 452.

Actuation of the programmer relay 464 causes switch arm 463 to close and thereby connect a 115 VAC power source to the show-start motor 221. At the end of +5 seconds, in one preferred program, the show-start motor 221 causes switch arm 465 of switch 227 to move from terminal 466 to terminal 467. Thus, a −24 VDC source of power applied to a tape relay 470 via line 468 is removed therefrom and the tape relay 470 acts to open contact arm 471 and thereby open a 115 VAC powerline otherwise connected by lines 472, 474, and 473 to the tape music system 408, 409. Deactuation of the tape relay 470 also acts to open contact arm 475 and disconnect the tape amplifier output 409 from the stage speaker 24. The tape amplifier output 409 is otherwise connected to the stage speaker 24 by way of switch arm 475, line 476, normally closed switch arm 477, line 478, normally closed switch arm 479, and line 480.

Transfer of the switch arm 465 to terminal 467 also connects a −24 VDC source of power via line 469 to the motorized dimmer 25 to turn down the house lights 16–19.

The second event of the SHOW START program occurs, for example, at +17 seconds at which time switch arm 481 of switch 228 is moved by the related cam from contact 482 to contact 483. At this time, a +24 volt DC voltage is applied via conduit 484, switch arm 481, and line 485 to the coil of a show relay 486. The other side of the show relay 486 has a −24 volt DC source of power connected thereto by way of switch arm 487, line 488, normally closed manual douse switch 304, and line 489. The actuation of the show relay 486 closes contact arms 490 and 491. At this time, a 115 VAC source of power is connected via line 493, switch arm 491, and line 494 to a douser solenoid (not shown) in the projector 11 and opens the douser. Closure of contact arm 490 acts to connect a +24 VAC source of power to a film audio relay 492 by way of line 450, line 495, normally closed stop switch 303, line 496, switch arm 497, line 498, closed switch arm 455, line 499, the closed switch arm 490, and line 500. The other side of the film audio relay 492 is connected to a −24 VAC source of power. Thus the film audio relay acts to move contact arms 501, 477, and 479 to the position opposite that shown in FIG. 12. At this time, a 115 VAC source of power is connected to the film audio system 401 by way of line 493, line 502, closed switch arm 501, and line 503. In addition, the output of the film audio amplifier 401 is applied to the stage speaker 24 via line 504, switch arm 479, and line 480. Thus, the second event in the SHOW START program acts to project the pictures onto the screen 27 and to turn the picture sound on.

The third event in the SHOW START occurs, for example, at +20 seconds in the program. At +20 seconds, switch arm 505 of switch 229 is moved from contact 506 to contact 507 and connects a 24 volt DC source of power via line 508 to the curtain-drive motor 23 to open the curtains 21 and 22.

The fourth event in the SHOW START acts to recycle the SHOW START programmer 225 by moving contact arm 461 of switch 230 from terminal 510 to terminal 509. When the contact arm 461 is at terminal 409, the rectifier 459 is disabled since the −24 VDC has been removed therefrom. However, the program motor 221 continues to operate as long as the cam assembly 214 (FIG. 8) is in engagement with switch 230 because the −24 VDC power is applied across contact arm 461 via line 511 to the coil 464. Since the programmer motor 221 continues to operate, the cam assembly 204 (FIG. 8) is permitted to disengage switch 230 whereby contact arm 461 returns to terminal 510. This arrangement assures that the programmer is cycled past the self-terminating operation. At this time, operation of the programmer 225 is at an end since the rectifier 459 is in a blocked or disabled condition. The programmer 225 is then at its recycle position.

At the end of the showing of the film, the contact actuating strip 110 described hereinabove with reference to FIGS. 6 and 7 acts through a time delay network 512 to initiate operation of the SHOW CLOSE programmer 226. The time delay network 512 includes a voltage regulating network consisting of a Zener diode 513 and a resistor 514 connected in series to a −24 volt conductor 519 and to a +24 VDC source of power on line 452 by way of line 520. The regulated 15 volts is applied to a parallel RC network via connector 521. The RC network includes serially connected resistor 516 and a variable resistor 515, and a capacitor 517 connected in parallel with the resistors 515 and 516. The output of the RC network is applied to the stationary contact 94 by lines 522 and 523. In addition, the output of the RC network is applied along lines 522 and 524, a diode 518, and lines 525 and 526 to the gate of a silicon control rectifier 527.

The capacitor 517 is maintained in a charged condition, being connected to ground via terminal 528, lines 522 and 523 and through the normally closed contacts 94 and 95, and also being connected to a 15 VDC supply applied to terminal 529.

The gate of the rectifier 527 is connected to ground through lines 526 and 525, the diode 518, line 523 and the closed contacts 94 and 95 to minimize transient noise pickup.

When the contact actuating strip 110 on the film 31 moves between the film driven rollers 92 and 93 (FIG. 7), the contacts 94 and 95 are opened by the clockwise movement of the extension arm 91. When the contacts 94 and 95 are opened, the normally charged capacitor 517 discharges through resistors 516 and 515 to generate a positive pulse on line 522 which is transmitted via the diode 518 and lines 525 and 526 to the gate of the rectifier 527.

The length of time that the contacts 94 and 95 are opened and the time constant of the RC network are two variables for controlling the magnitude of the pulse applied to the gate of the rectifier 527. It has been determined that a 3±½-inch length contact actuating strip 110 when operating with an RC network including a resistor 516 with a value of 1000 ohms and variable resistor 515 having a value of 500 ohms and capacitor 517 having a value of 1000 microfarads will be capable of preventing transient pulses having a duration of up to approximately 250 milliseconds from triggering the rectifier 527.

When the rectifier 527 fires as a result of the contact actuating strip 110 opening the contacts 94 and 95, a circuit including line 231, switch arm 532, contact point 533, the coil of programmer relay 531 and +24 VDC on line 549 is completed to actuate programmer relay 531. Actuation of the programmer relay 531 applies a 115 VAC power source to the programmer motor 224 to initiate the SHOW CLOSE program. An illustrative program of events is that, at +5 seconds, switch arm 543 moves from contact point 542 to contact point 544 to apply +24 VDC along line 546 to the curtain-drive motor 23 to close the curtains 21 and 22. At +10 seconds in the program, switch arm 540 of switch 234 moves from contact point 539 to contact point 541 to connect −24 VDC via line 545 to the motorized dimmer 25 to turn up the lights 16–19. At +17 seconds in the program, switch arm 487 of switch 233 moves from contact point 537 to contact point 538 to connect −24 VDC via line 547 to the coil of the tape relay 470 and thus energize the tape relay 470. Movement of contact arm 487 from contact point 537 opens a circuit including line 488, normally closed manual douse 304 and line 489 to the show relay 486 thereby to deenergize the show relay 486. When the show relay 486 is deenergized, its contact arms 490 and 491 open to remove power from the douser solenoid thereby to turn off the picture. Further, when contact arm 491 opens, a +24 VDC source of power connected via lines 453, 499, 500 is removed from the film audio relay 492 to deenergize it and move its contact arms 501, 477 and 479 to the position shown in FIG. 12. At this time, the film amplifier output 401 applied to line 504 is disconnected from the stage speaker 24.

When the tape relay 470 is actuated, its contact arms move to the position opposite that shown in FIG. 12 to connect the tape amplifier output 409 to the stage speaker 24 by way of relay arm 475, line 476, relay arm 477, line 478, relay arm 479, and line 480. Thus, the third event in the SHOW CLOSE program acts to turn the picture and picture sound off and the taped music on.

At +25 seconds in the SHOW CLOSE program, the fourth event is initiated by movement of switch arm 497 of switch 232 from contact point 535 to contact point 536. Thus, a +24 VDC source of power connected via line 496, line 498 and closed contact arm 455 to the start relay 454 is disconnected therefrom to deenergize the start relay 454. When the start relay 454 is deenergized, relay arm 456 opens to remove a source of 115 VAC power from the projector drive motor (not shown) in the projector lamp power supply to turn the projector off.

The fifth event in the SHOWCLOSE program acts to recycle the SHOW CLOSE programmer 226 by moving contact arm 532 of switch 231 from terminal 533 to terminal 534. When the contact arm 532 is at terminal 534, the rectifier 527 is disabled since ground (or −24 VDC) has been removed therefrom. However, the programmer motor 224 continues to operate as long as the cam assembly 205 is in engagement with switch 231 because ground is applied across arm 532 to the coil of the programmer relay 531. Since the programmer motor 224 continues to operate, the cam assembly 205 is permitted to disengage switch 231 whereby contact arm 532 returns to terminal 533. At this time, the program of programmer 226 is at an end since the rectifier 527 is in a blocked or disabled condition. The programmer 226 is then at its recycled position.

A manual-stop button 303, when depressed, acts to remove power from the start relay 454 in a manner similar to the fourth event of the SHOW CLOSE program by removing a 24 VDC source of power from line 496 which, in turn, applied this power across switch 232, along line 498, and closed switch arm 455 to the start relay 454.

A manual-show pushbutton 302 is also provided in the circuit to initiate the show relay 486 by connecting a 24 VDC source of power via line 548 to the coil of the show relay 486. Further, a manual douse pushbutton 304 is provided to open a circuit including switch 233, switch arm 387, line 488, the manual douse button 304, line 389, the coil of the show relay 486, closed relay arm 490, line 499, closed relay arm 455, line 498, switch arm 497, line 496, normally closed stop button 303, and line 495 to a +24 VDC source of power.

A manual break-cycle pushbutton 327 is provided to override the programmer 226 by connecting a 24 VDC source of power along lines 551 and 550, dropping resistor 530 and line 526 to the gate of the rectifier 527 to trigger the rectifier 527 and initiate the SHOW CLOSE sequence of events as described hereinabove. The manual break-cycle button must be compressed for a sufficient length of time to complete the SHOW CLOSE sequence.

The circuit of FIG. 12 also includes a manual tape-on pushbutton 406 for manually activating the tape relay 470. The tape-on pushbutton connects ground or −24 VDC to one side of the coil of the tape relay 470 and the normally closed tape-off pushbutton 407 connects a +24 VDC source of power to the other side of the tape coil.

With reference to FIG. 13, there is shown in detail a suitable two-projector circuit arrangement for the audio panel 402 described hereinabove with respect to FIG. 3. The circuit includes two film audio relays 600 and 601, each of which functions in the same manner as the film audio relay 492 of FIG. 12, and a tape relay 602 which operates as described hereinabove with reference to the tape relay 470 of FIG. 12.

Terminal 1 provides a ground on lines 658 and 603 connected to one side of the coils of film audio relays 600 and 601. The other side of relay 600 is connected by line 605 to terminal 6 which, in turn, is connected to line 500 of FIG. 12. Similarly, the other side of the coil of relay 601 is connected by line 604 to terminal 5 which, in turn, is connected to line 500 of FIG. 12. Terminal 2 connects line 468 of FIG. 12 by way of line 610 to contact 616 of the tape relay 602. A source of 24 VDC power is coupled via terminal 3 and line 662 to one terminal of the tape OFF switch 407.

Terminal 1 also connects ground to a contact of tape ON switch 506 by line 601. Terminal 4 connects line 547 of FIG. 12 to the other contact of tape ON switch 406. Terminal 7 is connected to line 473 and via line 612 to switch arm 618 of tape relay 602. Line 502 of FIG. 12 is connected by terminal 8 to line 616 and thereby to the bottom contact points 662 and 653 of the film audio relays 600 and 601. Terminal 9 connects line 474 of FIG. 12 to line 609 and thus to contact point 619 of the tape relay 602.

Terminal 13 connects line 504 (FIG. 12), which has coupled thereto the film amplifier output 401, to switch arm 661 of film audio relay 600. Similarly, the film amplifier output of the second projector (not shown in FIG. 12) is coupled to terminal 14 which in turn is connected by line 608 to the switch 2. 652 of the film audio relay 601. Contact arm 622 of tape relay 602 is connected via lines 625 and 628 to output terminal 1. Similarly, the tape contact point of monitor selector switch 404 is connected via line 628 to the output terminal 1 which in turn is connected to the tape amplifier output 409. Similarly, the tape contact of monitor selector switch 404 is connected along line 628 to the tape amplifier output 409 by way of output terminal 1. Contact point 671 of film audio relay 600 is connected by line 670 to output terminal 3 which, in turn, is connected to line 503 of FIG. 12 and to the film audio system 501. In like manner, contact 650 of film audio relay 601 is connected via line 638 to output terminal 5 which, in turn, is connected to the film audio system of the projector 2.

The ON terminal of OFF/TEST-ON speaker switch 403 is connected along line 634 to output terminal 7 which, in turn, is connected to line 480 of FIG. 12. The contact arm 626 of monitor selector switch 404 is connected along line 627 to output terminal 9 which, in turn, is connected to the monitor 400 as shown in FIG. 12.

A common line 629 is connected to the output terminals 2, 4, 6, 8 and 10 and to the tape amplifier output 409, the film audio system 401, the film audio system of projector two, the speaker 24, and the monitor 400, respectively. Line 629 is connected to line 659, dropping resistor 640 and line 639 to the OFF/TEST terminal of the speaker switch 403. The movable arm 635 of the speaker switch 403 is connected along line 636 to the line terminal of monitor selector 404. A test jack 405 is connected at terminal 675 to line 629 and at terminal 676 to line 636.

FIG. 14 shows an arrangement for the control panel 12 which is located outside the projection booth 10 and which is discussed hereinabove with reference to FIG. 10. The reference numerals denoted by a prime (') indicate elements of a second remote control automatic and manual system which functions in the manner as described with reference to FIG. 12. The second remote control system is provided to operate a second projector.

The projector one standby light 300 is connected to switch 59 (FIG. 2) by line 800 and to ground by line 801. Ground is also provided on one side of projector two standby light 309 by lines 802, 803 and 804. The other side of the standby light 309 is connected by line 810 to a switch 59′ located on the side of projector two in the manner shown in FIG. 2.

The upper contacts 813 and 814 of START pushbutton 301 are connected to lines 457 and 450 of FIG. 12 by conductors 801 and 812, respectively. The lower contacts 815 and 816 are connected to lines 452 and 450 of FIG. 12 by lines 817 and 812, respectively. In like manner, the upper contacts 819 and 820 of START button 311 are connected to lines 457′ and 450′, respectively; and the lower contacts 821 and 822 are connected to lines 452′ and 450′, respectively.

The SHOW button 302 has one terminal 328 connected to line 452 of FIG. 12 by lines 827 and 817. The other terminal 329 is connected to line 548 of FIG. 12 by lines 823, 824 and 825. Similarly, the terminals 828 and 829 of the SHOW button 310 are connected to lines 452′ and 548′.

Terminal 830 of the STOP button 303 is connected to line 496 of FIG. 12 by line 832. The other terminal 831 of the STOP button 303 is connected to line 450 of FIG. 12 by line 812. In like manner, the terminals 834 and 833 of the STOP button 313 are connected to lines 496′ and 450′, respectively.

Contacts 836 and 838 of the DOUSE button 304 are connected to lines 488 and 489 of FIG. 12 by conductors 836 and 835, respectively. Similarly, the contacts 837 and 838 of the DOUSE button 312 are connected to 489′ and 488′, respectively.

The terminals 845 and 846 of the curtain OPEN button 325 are connected by conductors 847 and 848, respectively, to the motor 23. The curtain CLOSE contacts 849 and 850 are also connected to the curtain motor 23 by lines 851 and 848, respectively.

The contacts 852 and 853 of the music ON button 321 are connected to line 547 of FIG. 12 and ground by conductors 854 and 855, respectively. The terminals 856 and 857 of the music OFF button are connected to the tape relay 470 and a source of +24 VDC by lines 858 and 859, respectively.

The upper contacts 570 and 571 of the break cycle switch 327 are connected to line 551 of FIG. 12 and to a 24 volt DC source of power by conductors 574 and 575. In like manner, the lower contacts 572 and 573 of the break cycle switch 327 are connected to line 551′ and to a 24 volt DC source of power. The light UP switch 331 has contact 579 connected by conductor 583 to the dimmer device 25. The other contact 580 of the UP switch 331 is connected to contact 581 of the DOWN switch 330. The contacts 580 and 581 have a common ground at point 578 which is provided by lines 576, 577 and 802 and 801. The other contact 852 of the DOWN switch 330 is connected by line 584 to the dimmer device 25.

The contacts 585 and 586 of the SCOPE masking switch 328 are connected to a standard masking control (not shown) by lines 587 and 588, respectively. Similarly, the contacts 589 and 590 of the conventional masking switch 329 are connected to the masking control (not shown) by lines 591 and 592, respectively. The focus control 308 comprises a pair of ganged arms 595, 598. The contacts 593 and 594 of arm 595 are connected to a standard focus control in projector one by lines 596 and 597, respectively. When arm 595 engages contact 593 or 594, the focal point will be adjusted. The contacts 599 and 600 of arm 598 are connected to a focus control in projector two by conductors 601 and 602, respectively, and operates in the same manner as contact arm 595 to control the focus of projector 2.

A plurality of lights 602–608 are provided behind the start pushbuttons 301 and 311, the show pushbuttons 302 and 310, the music on 321 pushbutton, the masking scope pushbutton 328, and the masking conventional pushbutton 329 of the control panel such that each of the lights 602–608 are turned on when its corresponding pushbutton is actuated. Pilot lights 305 and 314 are provided to indicate whether projector one or projector two is in operation. A further pilot light 320 has power applied thereto to become lighted when the manual ON music button 320 is actuated.

What is claimed is:

1. As a new use of light permeable tape, the method of cuing a film to cause an event or sequence of events to occur at a predetermined time during projection of the film comprising affixing a strip of the tape to a surface of the film, the tape being provided with a length dependent on film speed and adapted to produce a cue signal capable of being distinguished from film splices and noise signals.

2. A method as claimed in claim 1 wherein the tape is bonded to the film by an adhesive.

3. A method as claimed in claim 2 wherein the adhesive is a pressure responsive adhesive on the tape.

4. A method as claimed in claim 1 wherein the film is provided with sprocket holes and the tape is spaced from the holes.

5. A film projection system for projecting a film image and performing operations ancillary to the projecting of a film image, said system comprising film projection means for projecting a film image, a film, film transporting means for transporting said film through said film projection means, light permeable means having a predetermined length secured to a surface of said film, sensing means for sensing said light permeable means, control means to control operations ancillary to the projecting of the film image, and further means responsive to said sensing means and to said predetermined length for actuating said control means.

6. The system of claim 5 wherein said further means includes means to initiate a plurality of said operations.

7. The system of claim 5 wherein said further means comprises an RC network including a capacitor adapted to be in normally charged state and at least one resistor connected in parallel with said capacitor, said capacitor being discharged through said resistor in response to said sensing means sensing said light permeable means for a period of time related to said predetermined length thereby to generate a pulse related to said period of time.

8. The system of claim 5 wherein said further means comprises programmed means for controlling the occurrence of a plurality of events, and means interconnecting said RC network and said programmed means for actuating said programmed means in response to said pulse.

9. The system of claim 5 further including means for frictionally cleaning said film prior to the entry of said film into said film projection means.

10. The system of claim 9 wherein said cleaning means is adapted to move against the film in a direction opposite to the direction of movement imparted to said film by said film transporting means.

11. The system of claim 5 further including means for inactivating said film transporting means in response to a break in the film or absence of the film.

12. A system as claimed in claim 5, wherein the control means includes an electromechanical programmer including a self terminating switch to perform a self terminating operation and also including circuit means to assure that the programmer is cycled past the self-terminating operation to enable a subsequent cycle to be initiated.

13. A system as claimed in claim 5, wherein one of the operations is a film audio operation and another of the operations is a music providing operation to provide music between the showing of films, said system further comprising a stage speaker for selectively producing the film audio or music, means for blocking the music from the speaker during a film audio operation and means permitting monitoring of the music during a film audio operation.

14. In an automatic film projection system, means for projecting a film image, a film, means for transporting said film through said film projection means, light permeable means having a predetermined length affixed to said film for indicating projection of a predetermined portion of said film, signal-generating means responsive to said predetermined length of said light permeable means for generating a signal having a predetermined amplitude and/or magnitude, a plurality of operation controls for controlling operations ancillary to the projecting of the film, programmed means for initiating the performance of said plurality of operation controls in a predetermined sequence, and actuating means responsive to said signal for actuating said programmed means and initiating said performance of the plurality of controls.

15. The system of claim 14 wherein said signal-generating means comprises a pair of normally closed contacts, and means responsive to said light permeable means for opening said contacts.

16. The system of claim 15 wherein said signal-generating means further comprises a circuit including said contacts, a capacitor normally charged by said circuit, and at least one resistor connected in parallel with said capacitor, said capacitor being adapted to discharge through said resistor when said contacts are opened in response to said light permeable means thereby to generate said signal.

17. The system of claim 15 wherein said actuating means comprises power supplying means responsive to said signal for supplying power to said programmed means.

18. The system of claim 16 wherein said programmed means comprises a motor, a shaft adapted to be driven by said motor when said power supplying means supplies power to said motor, a plurality of cams fixedly secured to said shaft at spaced intervals therealong, and a plurality of switch means each actuable by one of said cams for initiating the performance of one of said controls.

19. The system of claim 18 wherein said cams include actuating portions circumferentially spaced about said shaft such that said switch means are actuated in sequence.

20. The system of claim 14 wherein said actuating means comprises gating means for gating current to said programmed means, said gating means adapted to respond to said signal to gate current to said programmed means and thereby actuate the same.

21. The system of claim 20 wherein said programmed means comprises a plurality of switch means for initiating the performance of said plurality of controls, and a plurality of cam means adapted to be displaced, in response to the opening of said gating means, for actuating said switch means in a sequence to initiate the performance of said plurality of controls.

22. The system of claim 21 wherein said plurality of switch means includes a recycle switch means having a first and a second position respectively for completing a circuit for current supplied by said gating means and for closing said gating means, said recycle switch means in said second position completing a further circuit for supplying current to said programmed means to return said recycle switch means to said first position.

23. The system of claim 21 wherein said controls include first means for closing a stage curtain, second means for turning theater lights up, third means for turning said film image off, fourth means for turning film audio off, fifth means for turning said film projection means off, and sixth means for turning a source of music off; said plurality of switch means being effective to actuate said first, second, third, fourth, fifth and sixth means in a predetermined sequence.

24. The system of claim 21 wherein said controls include first means for actuating a source of music, second means for turning theater lights down, third means for turning said film image on, fourth means for turning film audio on, and fifth means for opening a stage curtain, and a manually initiated programmed means including a plurality of switch means and a plurality of cam assemblies, said cam assemblies being positioned for actuating said plurality of switch means in a sequence, said plurality of switch means being adapted to actuate said first, second, third, fourth and fifth means in said sequence.